United States Patent [19]
Bendall

[11] 3,782,107
[45] Jan. 1, 1974

[54] AIR-COOLED ROTARY INTERNAL COMBUSTION ENGINE

[76] Inventor: Wilfrid H. Bendall, 19 N. Broad St., Pawcatuck, Conn. 02891

[22] Filed: Nov. 10, 1972

[21] Appl. No.: 305,334

[52] U.S. Cl. .............. 60/39.61, 123/8.09, 123/8.27, 418/101
[51] Int. Cl. ............................................. F02c 5/12
[58] Field of Search .................... 60/39.61; 418/100, 418/101; 123/8.45, 8.09, 8.19, 8.27

[56] References Cited
UNITED STATES PATENTS
891,394   6/1908   Benson ..................... 60/39.61 UX
1,987,882   1/1935   Watts ............................. 418/101 X
2,969,049   1/1961   Dillenberg ..................... 418/101 X
3,369,529   2/1968   Jordan ........................... 418/101 X Primary Examiner—Clarence R. Gordon

[57] ABSTRACT

An air-cooled rotary vane engine utilizing external and internal cooling air flow and a turbulence combustion chamber controlled by an automatic valve operated by the working fluid pressures; the engine is further constructed for operation with clearance sealing and dry internal lubrication.

21 Claims, 6 Drawing Figures

AIR-COOLED ROTARY INTERNAL COMBUSTION ENGINE

BACKGROUND OF THE INVENTION

Rotary engines in general and particularly those at present under intensive development utilizing multi-lobed epitrochoidal housings and variously contoured eccentrically orbiting rotors, present formidable combustion, sealing and cooling problems which tend to negate the compelling simplicity of the rotary principle and its potentially simpler construction, lower cost and lighter specific weight.

The desirable air-cooling of such engines further presents special difficulties and the principal purpose of the present invention is to provide such an engine of simpler construction and minimum bulk and weight particularly adapted for efficient air-cooled operation.

SUMMARY OF THE INVENTION

Accordingly, the engine of the present invention employs a uniformly cylindrical housing and rotor with circumferential external and internal cooling fins and with provision for externally and internally directed cooling air flow. Operation with uniform angular rotation at the more convenient shaft speeds and with the larger sealing areas permitted by the rotary vane arrangement conveys the further advantage of more manageable pressure sealing conditions than is possible with trochoidal engine configurations. The present engine therefore is designed to enable operation with minimally close running clearances to effect restricted clearance sealing of the operating interstices without requiring solid frictional sealing contact or lubrication at the critical pressure and thermal regions of the engine structure. In furtherance of these objects and in order to effect efficient combustion at high cyclical rates the design includes a high turbulence cylindrical combustion chamber interposed between sequential compression, combustion and expansion phases. This arrangement increases combustion efficiency and insulates the main engine structure from maximum thermal and dynamic stresses. Adaptability for multi-fuel operation is conveyed by the provision of means whereby the compression ratio and ignition means can be varied without major structural changes. Pumpless fuel injection may be effected by placement of simple low pressure feed injection nozzles in the combustion chamber communicating passage means. The uniformly round housing and combustion chamber end closures secured by cylindrical groove engagement retention means in place of a multiplicity of fastenings, lowers construction and assembly costs, conveys maximum accessibility and maintenance convenience, and provides a simple, reliable engine structure with a high power to weight ratio.

DESCRIPTION OF THE PREFERRED EMBODIMENT

Figure 1:
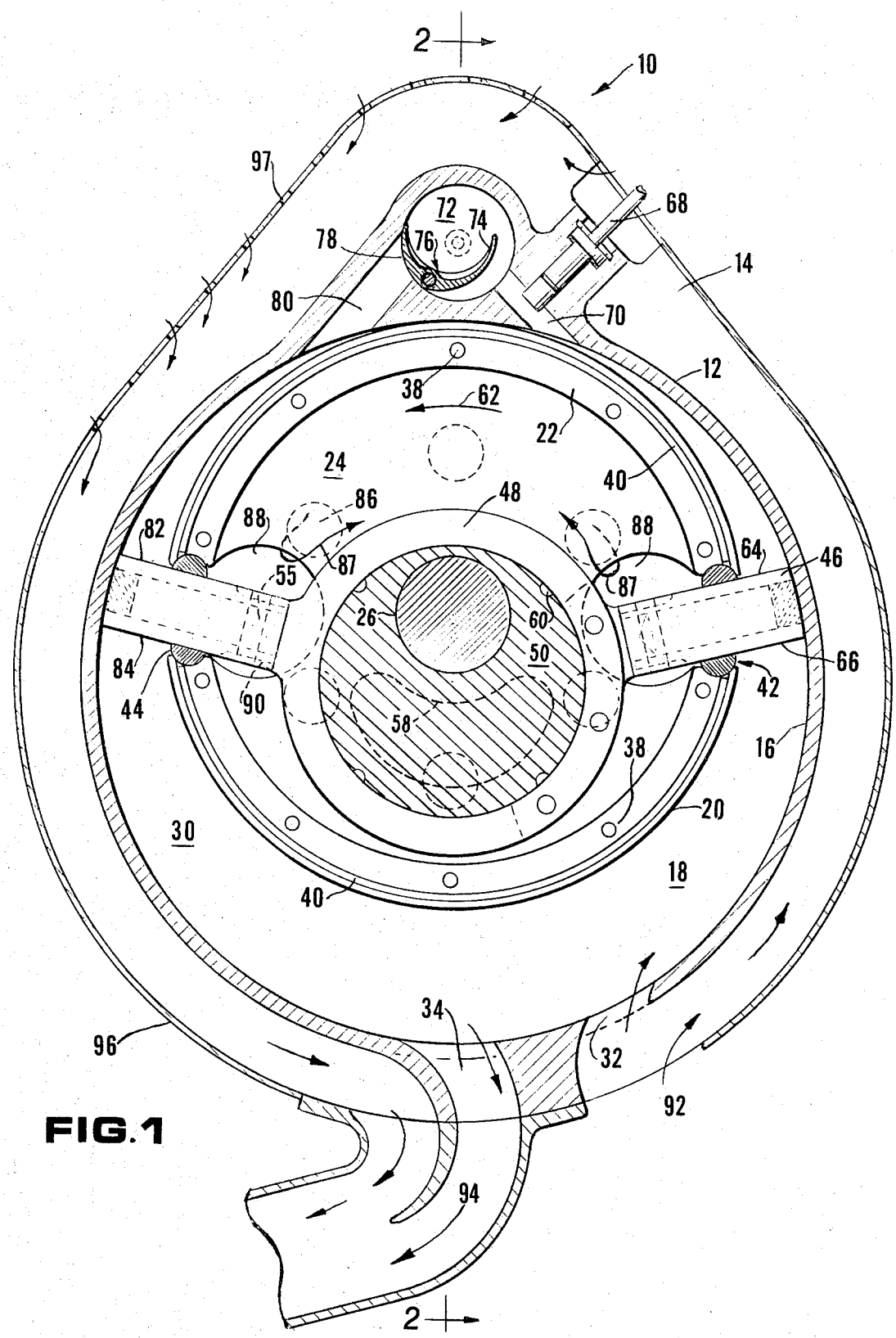
FIG. 1 is transverse partly diagrammatic sectional view of an air-cooled rotary internal combustion engine embodying the invention taken substantially along line 1—1 of FIG. 2.
Figure 2:
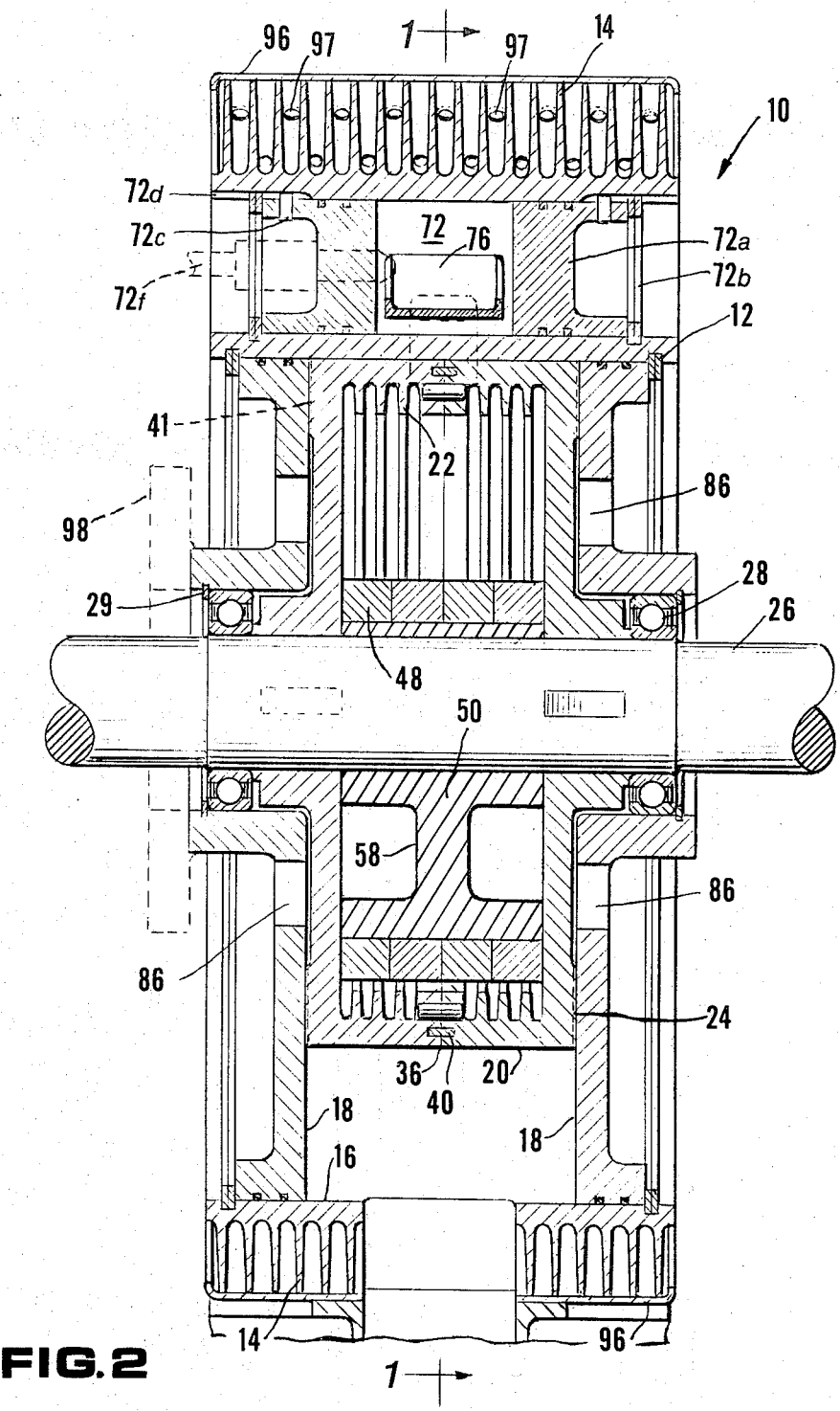
FIG. 2 is a sectional view taken substantially along line 2—2 of FIG. 1.

Referring to the drawings, specifically to FIGS. 1 and 2, reference numeral 10 generally designates a rotary engine according to this invention. The engine comprises a cylindrical outer body 12 provided with external cooling fins 14 and having an internal peripheral wall 16 enclosed by axially spaced end walls 18. A cylindrical inner body comprising rotor 20 is provided with internal cooling fins 22 and integral end walls 24. The rotor, keyed to a one-piece axis 26 extending through both bodies, is mounted eccentrically within the outer body and rotatably supported in sealed lubrication bearings 28. As shown, the bearing races center the rotor on axis 26 with respect to the outer body and are retained in the outer body end walls by retaining ring means 29.

The rotor outer peripheral and end surfaces are in minimally close rotational clearance with the inner peripheral and end walls of the outer body, the eccentric mounting of the rotor defining a circumferentially extending crescent-shaped displacement chamber 30 having working fluid inlet passage 32 and outlet passage 34. The rotor 20 further comprises two symmetrical coaxial halves abutting on a centerline joint 36 having locating dowels 38. Cylindrical sealing ring segments 40 engage coaxial grooves in the two halves of the joint. The outer peripheral surface and annular portions 41 of the rotor in close rotational clearance with the outer body may be provided with turbulence sealing grooves (not detailed) or a layer of abradable sealant to further reduce the rotor running clearance.

Figure 3:
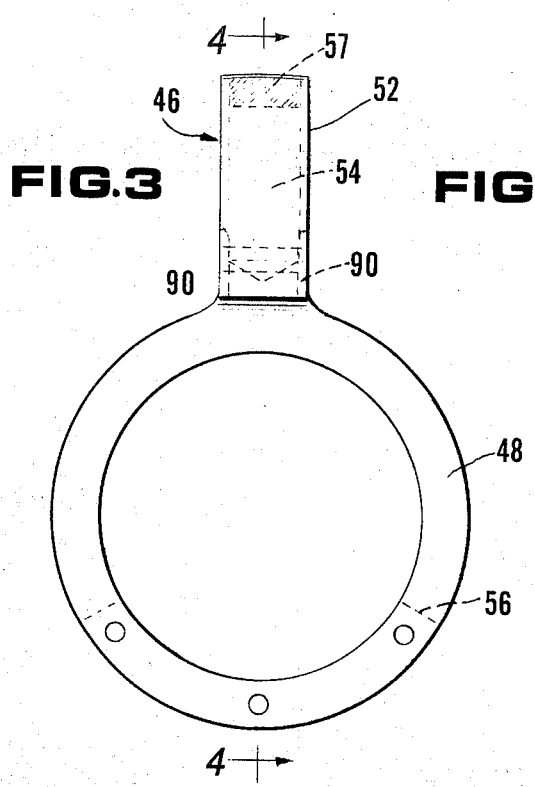
FIG. 3 is an end elevational view of a rotary vane member of the engine of this invention.
Figure 4:
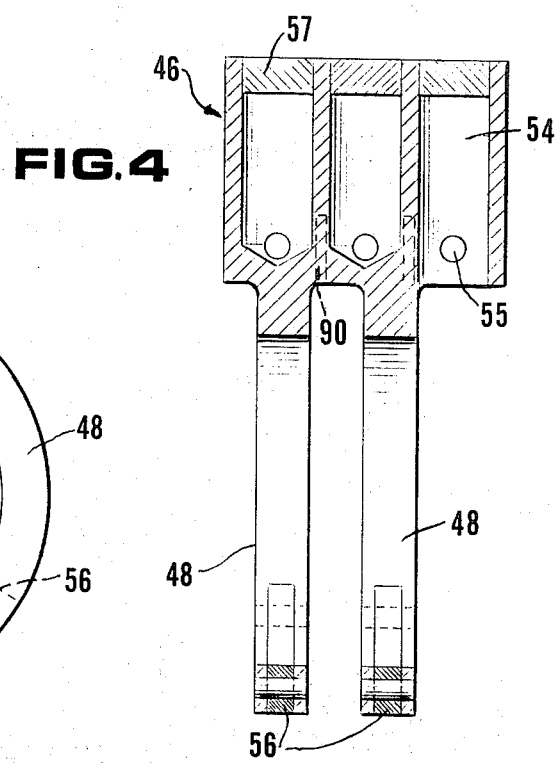
FIG. 4 is a sectional view of the vane taken along line 4—4 of FIG. 3.

Slots 42 in the rotor are provided with self-aligning, self-lubricated bearing elements 44 extending axially and supporting the combined angular and radial motion of vane members 46. The vane members, individually illustrated in FIGS. 3 and 4, are provided with offset inner end ring portions 48 for intermeshing with similar coaxial ring portions of an oppositely extending vane and are eccentrically centered for rotation relative to the rotor and axis 26 on stationary vane centering means 50 encircling the axis. As shown, centering means 50 may comprise a cylinder in offset suspension on axis 26, stationary with respect to the axis rotation and concentric with the outer body. The centering means preferably is constructed of lubricant-impregnated sintered metal or other self lubricated material, the operating load and PV bearing factors on this member normally being moderate enough to enable use of such material. The member may be recessed as indicated by reference numeral 58 for weight reduction or cooling purposes and may include axial grooves 60 at the inner peripheral contact with the vane rings for passage of cooling air.

The vanes are thus centered for rotation with their side and outer end portions in minimally close running clearance in the displacement chamber. The vane outer end portions 52 are bored out to provide internal cooling air passages 54 and 55 and to reduce centrifugal weight, the ring shaped inner ends 48 being provided with counterbalancing weights 56 secured in slots in the ring ends. The outer ends of the vane cooling air passages 54 are shown closed with plugs 57, preferably of porous material. Alternatively a larger plurality of such vane cooling air passages, of smaller relative sectional area, may be used and left open at their outer ends.

Figure 5:
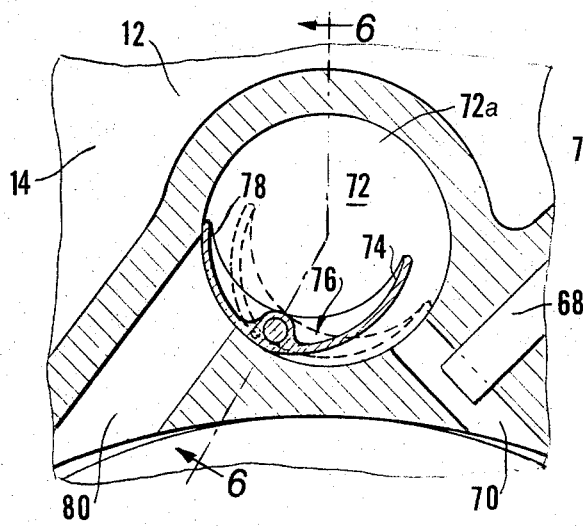
FIG. 5, on a larger scale, is a fragmentary sectional view of a combustion chamber and automatic valve of the engine of this invention.
Figure 6:
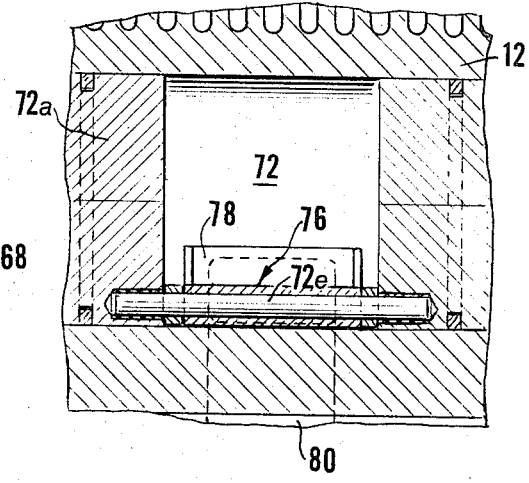
FIG. 6 is a sectional view on the line 6—6 of FIG. 5.

Shown on a larger scale in FIGS. 5 and 6, the cylindrical combustion chamber 72 integral with the outer body and external to displacement chamber 30, is provided with communicating inlet and outlet passages 70 and 80, respectively. The combustion chamber ends are closed with removable cylindrical closure plugs 72a, and retained by groove inserted rings 72b. This arrangement facilitates changes of compression ratio and ignition means, such as indicated by dash outline 72f, by changing plug axial lengths and ignition component inserts. The cylindrical plugs are prevented from rotating and are oriented with respect to each other and passages 70 and 80 by pins 72c engaging slots 72d in the combustion chamber bore. The plugs further serve to locate and retain an automatic valve 76, a light semicircular member with integral stiffening flanges, constructed of heat resistant material and supported for free oscillation on pivotal pin 72e extending between the plugs. This member is not required to be pressure tight and functions essentially as a baffle separating the cyclical operating phases in response to fluid pressure changes through the communicating passages, the portion 78 of this member on the combustion chamber outlet side being provided with a shorter effective pressure arm with respect to its pivotal center than the pressure arm of its opposite portion 74 on the inlet side.

An important feature of this invention is its provision for a continuous influx of cooling air throughout the engine structure during operation. The inherent pumping action of the vanes in the rotor body entrains cooling air through apertures 86 in the outer body end walls 18 and thence through clearance apertures 88 in the inner body end walls 24, the air flowing to the rotor interior as indicated by arrows 87. Air thus continuously pumped into the rotor interior is centrifuged to the rotor fins 22 and subsequently expelled through the vane and rotor operating clearances. Internal cooling air is further drawn out through vane slots 90 to the exhaust outlet 34. These cooling flows are supplemented by a continuous centrifugally induced counterflow through the vane and rotor operating clearances which usefully opposes the cyclical compression and expansion pressures. External cooling of the engine is effected by air inducted between the shrouded cooling fins 14 encircling the outer body. Air is drawn to aperture 92 by the normal interfin heat flow supplemented by the exhaust efflux at passage 34. The fin shrouding means 96 embodies a plurality of circumferentially spaced apertures 97 registering with the interfin passages for further entrainment of ambient air external to the engine.

The cooling method thus described permits engine operation at higher maximum and mean cycle temperatures and proportionately lower exhaust temperatures, and thus with higher combustion efficiency than attainable where free lubrication and contact sealing requirements limit and pollute engine performance. It will be noted that substantially the entire working and cooling fluid volume flows unidirectionally through the compression, combustion and expansion compartments. In operation, with the rotor turning as indicated by arrow 62 in FIG. 1, the right hand vane is compressing the working fluid in advance of its leading face 64 and is inducting a fresh charge through inlet 32 with the suction generated by its following face 66. High velocity flow in advance of the vane compression face reduces pressure at the fuel supply nozzle 68 for admission of fuel into passage 70 and thence to combustion chamber 72. Pressure in passage 70 has opened the inlet portion 74 of automatic valve 76 and simultaneously closed its combustion chamber outlet portion 78 leading to passage 80. The subsequent combustion and expansion simultaneously activates the valve to close passage 70 and open passage 80 for expansion of the working fluid against the retreating face 82 of the left hand vane. The leading face 84 of the left hand vane is simultaneously sweeping out a mixture of combustion gases and cooling air inducted during the preceding phase. An exhaust check valve (not shown) may be located at the exhaust outlet 34 but is not considered essential, the exhaust inertia being sufficient to effect substantial clearing during the expansion phase with a permissible admixture of inlet air.

While the drawing show the engine without the usual accessories, the dash outline 98 at the left side of FIG. 2 indicates an integral flanged extension of the outer body end wall which may be utilized for attachment of duplicate engine units and such starting, fuel pump and ignition devices as may be preferred, and also for attachment of engine installation bearers.

In comparison, the output torque of the twin-vane single rotor engine of this invention equals that of the double rotor epitrochoidal configured engines, without involving a negative torque component and in a structure with substantially half the weight, bulk and production cost. Its valve controlled combustion chamber and lubricant limited operation provides cleaner, more economical and more versatile combustion conditions, conveniently modifiable for various operating cycles. The structural design further reduces the required number of parts to a minimum and conveys maximum accessibility for economical maintenance.

What is claimed is:

1. An air-cooled rotary internal combustion engine comprising circumferentially finned outer and inner bodies, both of said bodies having axially spaced end walls provided with a plurality of apertures for admission of cooling air, said inner body being eccentrically mounted for rotation within the outer body on an axis concentric therewith and extending through both bodies, axis bearing means in said outer body end walls maintaining the inner body in minimally close internally tangential running clearance, said bodies being juxtaposed to define a circumferentially extending, crescent-shaped displacement chamber between the facing surfaces, said outer body having working fluid inlet and outlet passage means communicating with the chamber, said inner body having axially extending peripheral slots and radially disposed vanes, with vane outer end portions extending through the slots, said vanes having annular inner end portions axially mounted for rotation on centering means concentric with the outer body and eccentric of the inner body, said centering means being stationary with respect to axis rotation and maintaining the vanes for rotation thereon with their outer end portions in minimally close running clearance with the inner surface of the outer body, said vane outer end portions defining variable volume working chambers comprising abutment means for the working fluid cyclical intake, compression, expansion and exhaust phases in said chamber and said vane inner end portions comprising inner body abutment and displacement means for a working fluid inducted through said end wall apertures, a combustion chamber external to the displacement chamber interposed between said compression and expansion phases and having working fluid admission and transfer passage means communicating therewith at circumferentially spaced sides of the region of inner body tangency, said combustion chamber including valve means operated by transfer passage compression and expansion pressures.

2. A rotary engine as defined in claim 1 wherein the end walls of the inner body are provided with a plurality of apertures for passage of cooling air inducted through outer body apertures.

3. A rotary engine as defined in claim 1 wherein the inner body further comprises two coaxial and abutting cylindrical halves with registering means at a circumferential abutting line.

4. A rotary engine as defined in claim 3 wherein the inner body halves are provided with circumferential, axially spaced internal cooling fins.

5. A rotary engine as defined in claim 1 wherein the outer body and walls comprise cylindrical discs having axial hub portions and bearing portions for sliding assembly in the bore of the outer body and retention therein by annular retaining rings.

6. A rotary engine as defined in claim 1 wherein the outer body is provided with axially spaced circumferential cooling fins and fin shrouding means having a plurality of apertures registering with interfin spaces to entrain cooling air inducted through said apertures by the interfin air flow.

7. A rotary engine as defined in claim 1 wherein the vane members have rectangular-sectioned outer end portions engaging rotor slots and annular inner end portions engaging stationary axially mounted centering means.

8. A rotary engine as defined in claim 7 wherein the centering means includes an internal bearing on the axis and external bearing means for vane members.

9. A rotary engine as defined in claim 1 wherein the vane outer end portions embody a plurality of internal cooling air passages.

10. A rotary engine as defined in claim 1 wherein the combustion chamber is cylindrical in form and axially parallel to the displacement chamber.

11. A rotary engine as defined in claim 10 wherein the combustion chamber ends are closed by axially spaced removable cylindrical plugs secured by annular retaining means.

12. A rotary as in claim 11 wherein the engine compression ratio is adjustable by changing the axial length and spacing of the cylindrical plugs.

13. A rotary engine as defined in claim 1 wherein the valve means comprise a centrally pivoted semi-circular member having portions each side of the pivotal center shaped to conform to the combustion chamber wall at said communicating passages.

14. A rotary engine as defined in claim 13 wherein the valve simultaneously opens and closes the transfer passage means.

15. A rotary engine as defined in claim 1 wherein working pressures are substantially contained by minimally close adjacent surfaces without loaded rubbing or frictional contact and without fluid lubrication.

16. A rotary engine as defined in claim 15 wherein the bearing members are integrally sealed and lubricated, whereby exhaust polluting lubricating oil consumption by the engine is eliminated.

17. A rotary engine as defined in claim 1 wherein rotation of the vanes within the inner body inducts cooling air through apertures in the outer and inner body end walls and expels it through vane and inner body operating clearances for subsequent discharge through a displacement chamber outlet.

18. A rotary engine as defined in claim 17 wherein substantially the entire internally inducted working and cooling fluid volume is passed through displacement and combustion chambers and is expelled through a displacement chamber outlet passage.

19. A rotary engine as defined in claim 7 wherein the annular inner end portions of the vane members are weighted to balance the weight of the outer end portions.

20. A rotary engine as defined in claim 1 wherein the inner body is axially centered between the outer body end walls by inner body abutment with an inner bearing member and outer bearing member abutment with the outer body.

21. A rotary engine as defined in claim 1 wherein said transfer passage includes fuel supply means arranged for activation by working fluid pressure changes in said passage.

* * * * *